US009928604B2

(12) United States Patent
Crivelle et al.

(10) Patent No.: US 9,928,604 B2
(45) Date of Patent: Mar. 27, 2018

(54) METHOD AND APPARATUS FOR OBJECT TRACKING IN IMAGE SEQUENCES

(71) Applicant: THOMSON LICENSING, Issy les Moulineaux (FR)

(72) Inventors: Tomas Enrique Crivelle, Rennes (FR); Lionel Oisel, La Nouaye (FR); Fabrice Urban, Thorigne Fouillard (FR)

(73) Assignee: Thomson Licensing (FR)

( * ) Notice: Subject to any disclaimer, the term of this patent is extended or adjusted under 35 U.S.C. 154(b) by 0 days.

(21) Appl. No.: 15/209,199

(22) Filed: Jul. 13, 2016

(65) Prior Publication Data

US 2017/0018090 A1 Jan. 19, 2017

(30) Foreign Application Priority Data

Jul. 15, 2015 (EP) .................................. 15290185

(51) Int. Cl.
| | | |
|---|---|---|
| *G06T 7/00* | (2017.01) | |
| *G06T 7/20* | (2017.01) | |
| *G06T 7/11* | (2017.01) | |
| *G06T 7/194* | (2017.01) | |
| *G06T 3/40* | (2006.01) | |
| *G06T 7/60* | (2017.01) | |
| *G06T 7/13* | (2017.01) | |
| *G06T 7/90* | (2017.01) | |

(52) U.S. Cl.
CPC .................. *G06T 7/20* (2013.01); *G06T 3/40* (2013.01); *G06T 7/11* (2017.01); *G06T 7/13* (2017.01); *G06T 7/194* (2017.01); *G06T 7/60* (2013.01); *G06T 7/90* (2017.01); *G06T 2207/10024* (2013.01); *G06T 2207/20112* (2013.01)

(58) Field of Classification Search
None
See application file for complete search history.

(56) References Cited

U.S. PATENT DOCUMENTS 9,729,865 B1 * 8/2017 Kuo .................... G06K 9/00268
9,766,628 B1 * 9/2017 Lo ......................... G05D 1/0246
(Continued)

FOREIGN PATENT DOCUMENTS

CN 102074000 6/2014

OTHER PUBLICATIONS

Wang et al., "Mean-Shift Object Tracking with a Novel Back-Projection Calculation Method", 9th Asian Conference on Computer Vision, Xian, China, Sep. 23, 2009, pp. 83-92.
(Continued)

*Primary Examiner* — Delomia L Gilliard
(74) *Attorney, Agent, or Firm* — Jack Schwartz & Associates, PLLC

(57) ABSTRACT

Objects in an image sequence are tracked within a bounding box such that the object is assured to some extent of being contained within the bounding box. The location of the object within the bounding box is less important than knowing with some certainty that the object is within the bounding box, unlike previous methods that attempt to center an object within a bounding box. The approach, which uses histograms of image features such as color indices, is suited to applications such as zooming and is robust to occlusions, out-of-plane rotations, illumination changes and long-term tracking drift.

10 Claims, 14 Drawing Sheets

(56) References Cited

U.S. PATENT DOCUMENTS

2015/0063679 A1* 3/2015 Cook .................. G06F 3/04815
  382/154
2016/0092727 A1* 3/2016 Ren .................... G06K 9/00369
  382/103

OTHER PUBLICATIONS

Comaniciu et al., "Kernel-Based Object Tracking", IEEE Transactions on Pattern Analysis and Machine Intelligence, vol. 25, No. 5, May 2003, pp. 564-577.
Collins et al., "Online Selection of Discriminative Tracking Features", IEEE Transactions on Pattern Analysis and Machine Intelligence, vol. 27, No. 10, Oct. 2005, pp. 1631-1643.
Swain et al., "Color Indexing", International Journal of Computer Vision, vol. 7, No. 1, Nov. 1991, pp. 11-32.
Missaoui et al., "Similarity measures for efficient content-based image retrieval", IEE Proceedings on Vision, Image and Signal Processing, vol. 152, No. 6, Dec. 9, 2005, pp. 875-887.
Porikli, F., "Integral Histogram: A Fast Way to Extract Histograms in Cartesian Spaces", IEEE Computer Society Conference on Computer Vision and Pattern Recognition, San Diego, California, USA, Jun. 20, 2005, pp. 829-836.
Shengfeng He et al "Visual Tracking Via Locality Sensitive Histograms", Conference on Computer Vision and Pattern Recognition (CVPR), Jun. 23-28, 2013, pp. 2427-2434, ISBN: 978-0-7695-4989-7, DOI: 10.1109/CVPR.2013.314, IEEE.
Bruce D. Lucas et al."An Iterative Image Registration Technique With an Aapplication to Stereo Vision", Proceedings of the 7th International Joint Conference on Artificial Intelligence, Vancouver, BC, Canada, Aug. 24-28, 1981, pp. 674-679.
Jianbo Shi et al., "Good Features to Track", IEEE Conference on Computer Vision and Pattern Recognition CVPR, Jun. 1994, Seattle Washington, DOI: 10.1109/CVPR.1994.323794.
Carlo, Tomasi et al., "Detection and Tracking of Point Features" Shape and Motion form Image Streams: A Factorization Method-Part-3, Technical Report CMU-CS-91-132, pp. 1-20, Apr. 1991.
Yi Wu et al., "Online Object Tracking: A Benchmark", Conference on Computer Vision and Pattern Recognition (CVPR), Jun. 23-28, 2013, pp. 2411-2418, ISBN: 978-0-7695-4989-7, DOI: 10.1109/CVPR.2013.312, IEEE.

* cited by examiner

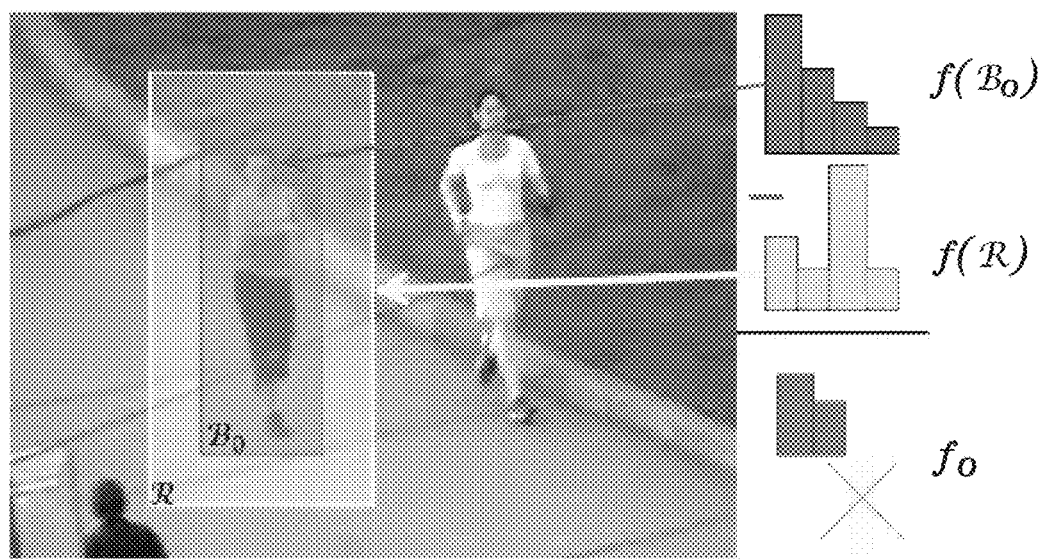
Figure 5
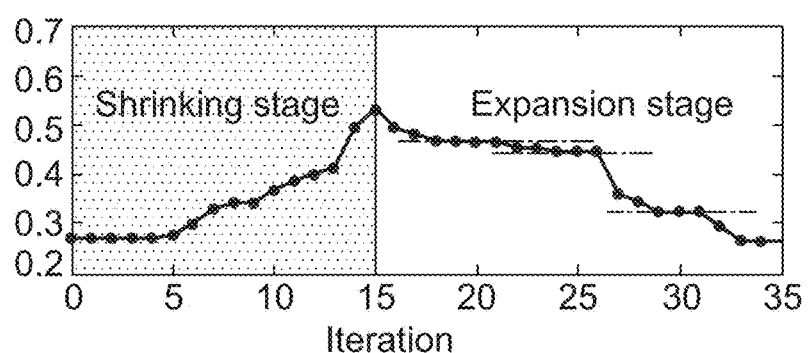
Figure 6

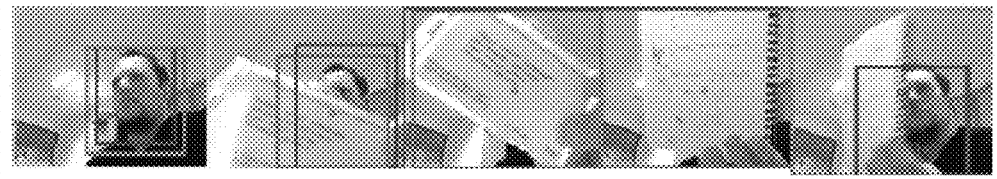
Fig. 14 a) Total occlusion
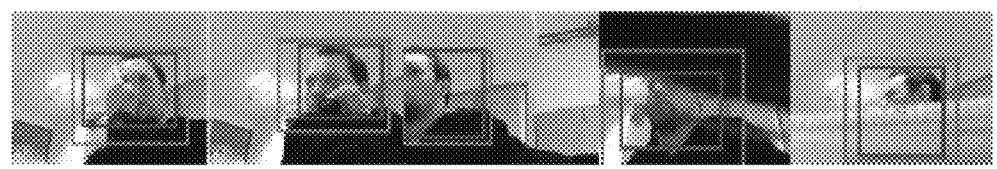
Fig. 14 b) Partial occlusion
Fig. 14 c) Background clutter
Fig. 14 d) Out-of-view
Fig. 14 e) Robustness

METHOD AND APPARATUS FOR OBJECT TRACKING IN IMAGE SEQUENCES

This application claims the benefit, under 35 U.S.C. § 119 of European Patent Application No. 15290185.6, filed Jul. 15, 2015.

TECHNICAL FIELD

The present principles relate generally to the field of video object tracking.

BACKGROUND

Visual tracking is the problem of determining the position of a target object in each frame of a video sequence. There are two main approaches to code such information. The first and more common representation of an object location is through a bounding box, defined by the position of its four corners (as shown in FIG. 1a). This simplifies many tasks such as user selection, window adaptation and background modeling, at the cost of assuming that the center of this window is supposed to coincide with the center (of mass) of the object. Moreover, if scale and/or rotation are authorized to change, its span should coincide with the span of the object. In essence, it provides a low-order model of the object support. In a more sophisticated representation some algorithms decompose objects into interacting simple-shaped parts for the sake of relaxing rigidity constraints. Time is of course an additional dimension in such representations.

Ideally, the object changes its appearance and its shape more slowly than its location and thus its most likely position is the closest, in some feature or model space, to a template obtained from the first image and possibly updated along the sequence. In a real situation, even small deformations, for example correlation noise, occlusions, or deformation, introduce drifting effects in determining the position of the bounding box in a next frame. Moreover, considering the current position of the bounding box as the valid center of mass of the object can be misleading, such as for non-symmetric objects, and a wrong initialization for the following frame, as exemplified in FIG. 1a. Such drifts, accumulated in time, can make the assumptions described in the previous paragraph invalid and the tracker unable to recover.

A second approach to visual tracking is to formulate the problem as the spatial segmentation of the object at each frame. While being readily more precise in determining the object support, it requires an additional complexity which can be granted for some applications (for example, rotoscoping) but a killer in other contexts (for example, multi-object real-time surveillance). In terms of tracking performance however, it has been shown that the top-performing trackers are those that assume a simple-shaped representation. These representations are more robust to deformations, achieve longer stability and can run at incredible speeds.

In principle, a tracker establishes a quest for the optimal position following some cost criteria, such as minimum position error, higher correlation, best detection response, for example. This is the case for different classes of trackers such as optimal filtering based trackers, descriptor based trackers or more recently, tracking-by-detection approaches. As suggested in a recent analysis, the performance of top trackers according to recent benchmarks has shown global figures of approximately 80% for correctly tracked frames. It is customarily assumed that for a frame the object is tracked if the ground-truth bounding box and the estimated bounding box intersect each other in some proportion.

For some applications or constrained setups this number can increase. For other application settings, this is barely enough. In the present case, one of the motivations of the proposed method described herein is its application to the problem of automatic object zooming and cropping in user-generated videos, which requires high robustness, long term functioning, and on the contrary, is not demanding in terms of location precision. While Region of Interest (ROI) and saliency-based approaches for video retargeting exist, object-based approaches relying on the performance of existing generic trackers not adapted to this scenario are therefore not convincing.

SUMMARY

The described embodiments strive to solve a different problem that can be interpreted as a different task closely related to visual tracking. Depending on the application, classical constraints can sometimes be relaxed, providing different criteria for locating the object at any time instant. The only assumption is that a bounding box may contain, or may not contain, the object, but it is certainly not the object itself nor does its center necessarily coincide with the object's position.

According to one general aspect, a method for obtaining a bounding box into a second image containing an object of a first image is provided. The method comprises representing the first image by a color index map wherein a color index corresponds to a color and a color index is assigned to each pixel of the first image. The method further comprises computing a first histogram based on the color indices of the pixels belonging to a first window in the first image containing the object; and computing a second histogram based on the color indices of the pixels belonging to a second window in the first image surrounding the first window. The method then comprises obtaining an object template by calculating a difference between the first histogram and the second histogram and keeping those values of the object template that are positive and setting negative values of the object template to zero. The method further comprises calculating a hemi-metric distance between the object template and a histogram based on color indices of pixels belonging to a current window of the second image. The method further comprises reducing the current window until said hemi-metric distance is no longer less than a threshold followed by enlarging the current window using each corner coordinate of the current window until the object is contained within the current window to produce a bounding box in the second image containing the object of the first image.

According to various characteristics:
  the histogram based on color indices of pixels belonging to a current window of the second image is obtained from an integral histogram of the second image;
  the bounding box is obtained for a plurality of second images of a video sequence and temporally filtered.

Advantageously, the hemi-metric distance is representative of a proportion of pixels in the object template having no pixel in a current window of the second image with an equal color index According to another general aspect, an apparatus for obtaining a bounding box into a second image containing an object of a first image is provided. The apparatus comprises a first processor that is configured to represent the first image by a color index map wherein a color index corresponds to a color and a color index is assigned to each pixel of said first image, and a second processor to compute a first histogram based on the color indices of the pixels belonging to a first window in the first image containing said object and computes a second histogram based on the color indices of the pixels belonging to a second window in the first image surrounding the first window. The apparatus further comprises a third processor that obtains an object template by calculating a difference between the first histogram and the second histogram and keeps those values of the object template that are positive and sets negative values of the object template to zero and calculates a hemi-metric distance between the object template and a histogram based on color indices of pixels belonging to a current window of the second image. The apparatus further comprises a fourth processor to reduce the current window until the hemi-metric distance is no longer less than a threshold and enlarges the current window using each corner coordinate of the window until the object is contained within the window to produce a bounding box containing the object.

According to various characteristics:
the histogram based on color indices of pixels belonging to a current window of the second image is obtained from an integral histogram of the second image;
the apparatus comprises a processor that obtains the bounding box for a plurality of second images of a video sequence and temporally filters the bounding box.

According to a specific embodiment, the device belongs to a set comprising:
a mobile device;
a communication device;
a game device;
a set top box;
a TV set;
a Blu-Ray disc player;
a player;
a tablet (or tablet computer);
a laptop;
a display;
a camera and
a decoding chip.

According to a third aspect, a non-transitory program storage device is disclosed that is readable by a computer, tangibly embodies a program of instructions executable by the computer to perform the disclosed method in any of its variants.

The details of one or more implementations are set forth in the accompanying drawings and the description below. Even if described in one particular manner, it should be clear that implementations can be configured or embodied in various manners. For example, an implementation can be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

BRIEF DESCRIPTION OF THE DRAWINGS

The present principles can be better understood in accordance with the following exemplary figures, in which:
FIG. 5 shows template learning;
FIG. 6 shows window adjustment;
FIGS. 14 a-e each show behavior of hemimetric-based tracker for different sequences.

DETAILED DESCRIPTION

Figure 1A:
FIG. 1A shows a representation of an object via an enclosing bounding box.
Figure 1B:
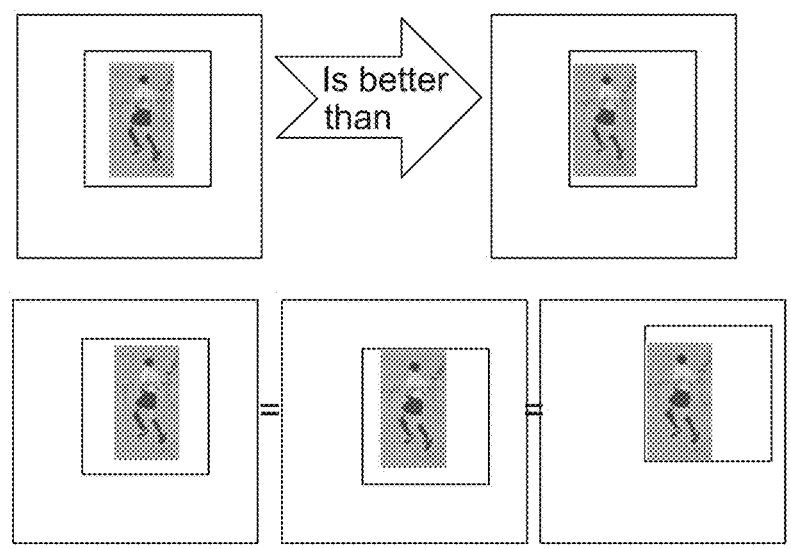
FIG. 1B shows the approach taken by the present principles.
Figure 2:
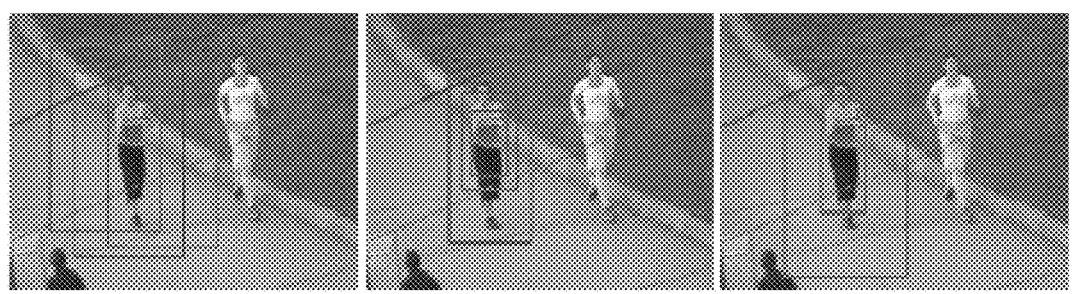
FIG. 2 shows locating an object within a frame.

The approach described herein essentially departs from existing tracking frameworks. Instead of searching for the best position of a bounding box, the instant approach looks for an image window such that it can be guaranteed to some extent that the object is inside this window. While minimizing the position error is the objective of previous approaches, the present approach considers acceptance criteria in that the object is inside a bounding box. An example of this is shown in FIG. 1b, where the classic approach is shown on top, and the present approach shown below. Note that in this sense, several possibilities are accepted as equally optimal. An example of this is also shown in FIG. 2.

This method turns out to be more flexible in the sense that the location precision is not a mandate, and as a consequence, it concentrates more on the robustness against occlusions, out-of-plane rotations, and long-term tracking drift. The method shows an improved performance with respect to state-of-the-art trackers in the context of a class of applications, turns in real time and at low frame rates and the implementation is simple.

In template matching, upon which tracking algorithms rely strongly, there is always the notion of a feature space, also known as a measurement space or observation space. It can be a reduced-order representation of the target or a full template image patch, a fitted data model or a complex combination of multiple image cues. The feature space is equipped with a similarity measure that permits the method to assess the most similar region of an image with respect to the template. Raw nearest neighbor search approaches use locally aggregated Euclidean distances between feature vectors, such as color, for example. Tracking-by-detection methods rely essentially on a classifier response which is a function of the correlation, either linear or kernelized, within a feature space. Optimal filter-based tracking algorithms include an observation process most commonly obtained from a matching cost probabilistic modeling. These measures often induce a distance or a metric d(x,y), understood as a function of a pair of feature vectors x, y which is non-negative, symmetric, subadditive (triangle inequality) and respects the separation axiom (d(x,y)=0 ⇔ x=y).

Some of these de-facto properties of distances can in fact considerably affect the behavior of a tracker. Two such issues are described next.

Figure 3:
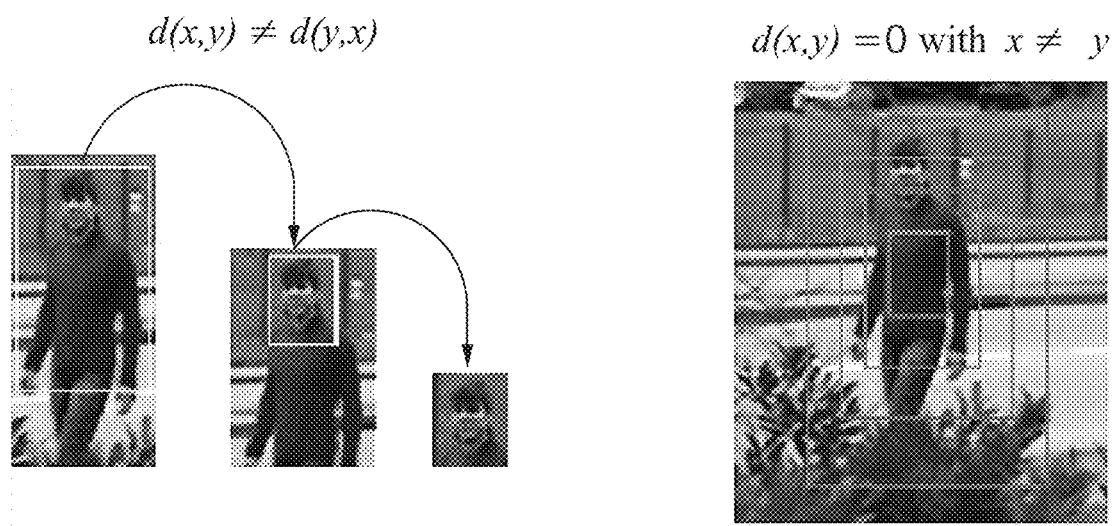
FIG. 3 shows a sequence of objects enclosed by their bounding boxes where one object can represent the other but not conversely.

Given two objects, the degree of similarity between them should by intuition be symmetric. This notion, however, does not take into account that in the matching process there is a reference template and a candidate tested against the latter. As mentioned, a window around the target object is not the object itself. Hopefully, it contains most of the information about the object and provides a good representation of it. The more realistic question is then, from which candidate window can be extracted the most similar representation of the reference target? One immediately imagines an example where the reference can be fully represented with a given window, but not vice versa, as in FIG. 3 for example. The degree of similarity should relax the symmetry condition, requiring it only to decrease if the candidate encloses the reference, and not necessary the contrary. As a consequence a metric can be built that is robust to variations on the template selection which is specially an appealing property during initialization.

Suppose the focus is on a target object and it is to be enclosed with a bounding box. Hence, the original visual object, that is, the set of pixels that belong to it, is mapped to a window which is a higher dimensional representation. Thus the same object can be mapped to several windows or, stated another way, different windows can be used to equally represent the same object. Then a feature vector can be computed, for example, for two of such windows. A distance defined between them should ideally be zero as they represent the same object. However, for different windows one expects to measure different feature vector values because essentially at the same time, a containing window does not exclusively contain the target object in the large sense of any subset of pixels inside the window. Thus, there should be different feature vectors with zero distance between them. Note that this is a direct consequence of how an object is represented through the simplified figure of a bounding box.

A distance function that may not be symmetric and that may not respect the separation axiom is called a hemimetric or quasi-semi-metric. Straightforwardly, every metric is also a hemimetric.

The problem to be considered is how to determine if a target object is enclosed by a window at a given time instant of a video sequence. Define the target object by its 2D support $\mathcal{O}_0$, and a bounding-box or window by $\mathcal{B}_0 \supset \mathcal{O}_0$ at time $t_0$ in image $I_0$. A feature vector $f(\mathcal{B}_0)$ is extracted and associated to $\mathcal{O}_0$. Consider now a different window $\mathcal{B}_k$ in image $I_k$. According to the setting described before, define a distance $h(f(\mathcal{B}_0),f(\mathcal{B}_k))$ such that $h(f(\mathcal{B}_0),f(\mathcal{B}_k))=0$ if and only if $\mathcal{O}_k \subset \mathcal{B}_k$, that is, it takes a minimum value if the window contains the object support at time $t_k$. Note that this is defined as a successful tracking, not the minimization of position error.

It is worth noting that this condition is not compatible with a symmetric distance. In effect, take another window $\mathcal{B}'_k \subset \mathcal{B}_k$ such that $\mathcal{O}_k \subset \mathcal{B}'_k$, then from the triangle inequality $h(f(\mathcal{B}_0),f(\mathcal{B}'_k)) \leq h(f(\mathcal{B}_0),f(\mathcal{B}_k))+h(f(\mathcal{B}_k),f(\mathcal{B}'_k))$. As by hypothesis $h(f(\mathcal{B}_0),f(\mathcal{B}_k))=0$ and $h(f(\mathcal{B}_0),f(\mathcal{B}'_k))>0$, then $h(f(\mathcal{B}_k),f(\mathcal{B}'_k))>0$. However, $\mathcal{B}'_k \subset \mathcal{B}_k$ implies $h(f(\mathcal{B}'_k),f(\mathcal{B}_k))=0$. Hence, the distance is not symmetric. Moreover, as $h(f(\mathcal{B}_k),f(\mathcal{B}'_k))>0$, $f(\mathcal{B}_k) \neq f(\mathcal{B}'_k)$ and thus the separation axiom is not satisfied.

It has just been shown that from the very definition of the problem, conditions on the distance function for template matching naturally arise. The next step will be to define the feature space, the equipping hemimetric and the tracking algorithm.

Figure 4:
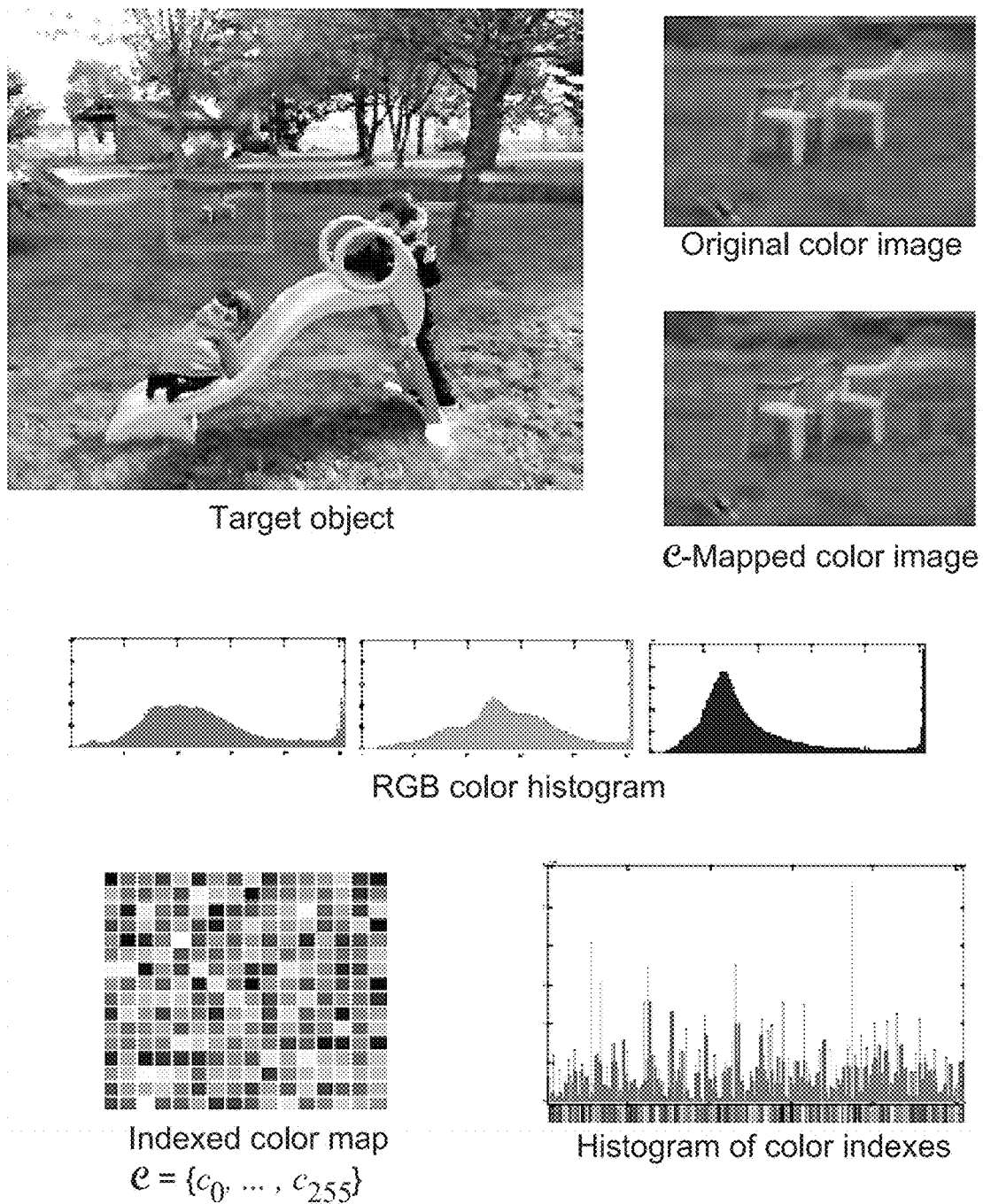
FIG. 4 shows quantified color histograms.

From a window $\mathcal{B}_0$ color-based features can be obtained as follows. The color image $I_0$ is first quantized into C=256 dominant color values $c_0$, indexed by i:0 . . . 255. This can be done by minimum variance quantization, which generates an indexed color map $\mathcal{C}=\{c_0, \ldots, c_{255}\}$. An example is shown in FIG. 4. Other techniques such as Automatic Color Palette can be used as well. For the window under analysis, a 256-bin histogram $f(\mathcal{B}_0)$ of color indexes is obtained, with the particularity that the bin count for each bin is kept, without normalization. Thus, $\Sigma_{i=0}^{255} f_i(\mathcal{B}_0)=N$ where $N=|\mathcal{B}_0|$, the number of pixels inside the window $\mathcal{B}_0$. This not only models the color distribution of the target but also the color mass of each bin, which permits better coding of the amount of presence/absence of the object. This will be elaborately on shortly.

The use of color palettes has been shown to be very useful in making the feature vector perceptually meaningful and more robust to noise and color variations. Besides using color indices, histograms of arbitrary image features can be used. For example, image gradients, binary patterns and feature descriptors can be used.

The colormap $\mathcal{C}$ is obtained from the first image $I_0$ where the target object is determined and kept invariant across the tracking process. Each time a window $\mathcal{B}_k$ is evaluated at a given instant, the color vectors of the corresponding image $I_k$ are mapped to the closest indexed color vector, in terms of the Euclidean distance.

Let $f(\mathcal{B}_0)$ be the template reference feature vector obtained from the first image and the target object. At a given instant $t_k$ and for a given bounding box $\mathcal{B}_k$ define the hemimetric:

$$h(f(\mathcal{B}_0),f(\mathcal{B}_k))=\Sigma_i \delta_{\geq 0}(f_i(\mathcal{B}_0)-f_i(\mathcal{B}_k)), \quad (1)$$

where $\delta_{\geq 0}(z)=z$ if $z \geq 0$ and $\delta_{\geq 0}(z)=0$ otherwise.

Assume that $h(x,y)$ with $x=\{x_i\}$, $y=\{y_i\}$ is a hemimetric. To show this, note that the distance is non-negative; non-symmetric as it suffices that for one i, $x_i > y_i$ so that $h(x,y) \neq h(y,x)$ and neither have the separation property as in this case $h(y,x)=0$. Finally the triangle inequality stems from $\delta_{\geq 0}(x-y)=\delta_{\geq 0}(x-z+z-y) \leq \delta_{\geq 0}(x-z)+\delta_{\geq 0}(z-y)$.

The feature vector f(•) stores the number of pixels assigned to each color index of the colormap C; the function h counts the number of pixels in excess at each bin for window $\mathcal{B}_0$ with respect to $\mathcal{B}_k$. In other words, recall that modelling an object inside a window as the counting of pixels of each color; $\mathcal{B}_0$ being the reference template, it is desired for $\mathcal{B}_k$ to have sufficient information to be able to represent it or describe it. Thus, the accumulated number of pixels in excess is a measure of how many pixels in $\mathcal{B}_0$ couldn't be found in $\mathcal{B}_k$, roughly assuming a 1-to-1 association of pixels between windows.

To implement template learning, start from a sequence of color images $I_{n:0 \ldots T}$. An initial location of a bounding box or window $\mathcal{B}_0$ containing the target object in $I_0$ is given, previously determined by manual input or an automatic object detection stage. The feature vector $f(\mathcal{B}_0)$ is computed as explained before.

An external region $\mathcal{R}$ surrounding the original bounding box, as exemplified in FIG. 5, is considered and a histogram of indexed colors is computed on this external ring, and considered as a background feature, $f(\mathcal{R})$. Then, compute the difference $d(\mathcal{B}_0)=f(\mathcal{B}_0)-f(\mathcal{R})$ and the final template histogram is set to $f_i=d_i$ if $d_i>0$ and $f_i=0$ a otherwise. In this way the only part of the feature vector that is kept represents the object that cannot be compensated by the close background. This avoids modeling non-discriminative colors. Hereafter, the resulting template feature is denoted by $f_0$.

Suppose the position and shape of the bounding box for a given frame $I_k$ of the sequence is known. Its coordinates are described by the quadruplet $\mathcal{B}_k=[x_{left}, y_{top}, x_{right}, y_{bottom}]$. For the next frame, start computing an integral histogram $\mathcal{H}$ [30] of the image, previously quantified according to the color index map $\mathcal{C}$, resulting in a width× height×C (with C=236) array of bin counts and allowing a posterior very efficient computation of histograms for several windows on the image.

The hemimetric defined earlier is designed to guarantee that the object is contained within the selected window. However, note that the trivial solution of a window as large as the image, always contains the target object, if visible. Effectively, $h(f_0,f(I_k))=0$. To avoid this degenerate situation, the similarity computation is embedded into a window adjustment heuristic oriented to favor solutions giving smallest windows. The problem is correctly reformulated as finding the smallest window that guarantees that the object is inside.

To initialize this approach, a bounding box is determined by taking the previous bounding box and enlarging its size by some proportion or number of pixels in each coordinate, i.e. $\mathcal{B}_k^0 \leftarrow [x_{left}-\Delta_x, y_{top}-\Delta_y, x_{right}+\Delta_x, y_{bottom}+\Delta_y]$. The enlargement is set according to an expected maximum displacement of the object. In the limit, it can be the whole image. From the integral histogram $\mathcal{H}$ is rapidly obtained $f(\mathcal{B}_k^0)$.

To uniformly shrink the window, the window is reduced in one or more pixels per coordinate. This can be done by compromising speed relative to precision, for example, all the coordinates at the same time to obtain $\mathcal{B}_k^1$ or, in general, $\mathcal{B}_k^j$ for the j-th iteration, as shown in the example of FIG. 6. Then if the condition $h(f_0,f(\mathcal{B}_k^j))<\alpha|\mathcal{B}|$ is true, it is considered that a proportion $\alpha$ of the total object size $|\mathcal{B}_0|$ is contained by the window. This uniform shrinking is continued while the previous condition on the hemimetric is maintained. Effectively the process stops when a significant part of the object is outside the window.

To non-uniformly expand the window, the following method is used. Because $\alpha>0$ it cannot be said that the object is fully within the current window $\mathcal{B}_k^j$. The window has to be readjusted by enlarging each coordinate, but this time one coordinate at a time, as shown in the example of FIG. 6. Each side of the window is expanded separately and thus in a different amount (non-uniformly) which permits not only to readapt the size of the window but most importantly to adjust its center position. Hence, for a fixed coordinate among the four, the window is enlarged in one or more pixels while $h(f_0,f(\mathcal{B}_k^{j+1}))<h(f_0,f(\mathcal{B}_k^j))$ i.e. as long as the new window is strictly better in terms of assuring that the object is inside. Here note that as $\mathcal{B}_k^j \subset \mathcal{B}_k^{j+1}$ then $h(f_0, f(\mathcal{B}_k^{j+1}))\leq h(f_0,f(\mathcal{B}_k^j))$. The strict reduction on the distance indicates that a new part of the object was indeed attached to the new window. At this point, it is interesting to give a glance on the shape of the hemimetric function with $\alpha=0.5$ as shown in the bottom of FIG. 6. The enlargement of the coordinate stops when there is no more reduction in the distance, that is, a bigger window is not better. Note in the plotted function that the final value of the metric is effectively similar to the starting value, as both windows contain the like object. The final window however, is considered a better candidate in terms of shape and size. The last iteration result is the estimated for that frame, namely $\tilde{\mathcal{B}}_k$.

The object template is the histogram of color index bin counts $f_0$. Updating it means modifying the value of one or more bins. One of the key issues in template updating is how to avoid sticking to the background, that is, slowly learning the background as the target object. For this reason, in one embodiment, a conservative approach is taken. The biggest bin of the template $f_0$ is extracted, which is supposed to point to the dominant color of the object. If this bin index is i, use $f_i(\mathcal{B}_0)$. The template is then updated only at such bin by $$f_i^{new}(\mathcal{B}_0)=(1-\beta)f_i(\mathcal{B}_0)+\beta f_i(\tilde{\mathcal{B}}_k) \qquad (2)$$

where $f_i(\tilde{\mathcal{B}}_k)$ was defined as the i-th bin of $f_i(\tilde{\mathcal{B}}_k)$ and $\beta$ is an adaptation coefficient. In this way the template colors are updated only if they belong to the object and the updating of secondary colors that belong to the background is avoided. Note that the update can include an augmentation of the number of pixels at a given bin in $f_0$. This allows adapting not only the color distribution of the object but also a possibly varying size.

The implementation of this algorithm is straightforward. The main task is the computation of the color histograms for the multiple windows that are tested during the shrinking and expansion stages. This process is sped up through the use of integral histograms. While receiving a new image, the integral histogram $\mathcal{H}$ (x,y) can be computed for the whole image or for a sub-image where the object is searched. The extraction of each feature vector is then immediate.

The complexity of such integral technique is roughly O(width×height×C) in time but also in memory, that is, it is linear in the number of pixels of the image or search range for a given bin size C. Direct histogram computation would require O(width×height×(C+$|\mathcal{B}_0|$)). Thus, integral histograms start to be more efficient if $C<|\mathcal{B}_0|$ and the image is not that large due to the required memory to store $\mathcal{H}$. In the case of the proposed method, large images are reduced in resolution for this sake. Moreover, the use of color quantization not only better represents the dominant colors, but also renders the method more efficient.

In terms of the parameters, they are set as follows in all the experiments: $\alpha=0.5$, $\Delta_x=\Delta_y=50$, C=256, $\beta?=0.2$.

Figure 7:
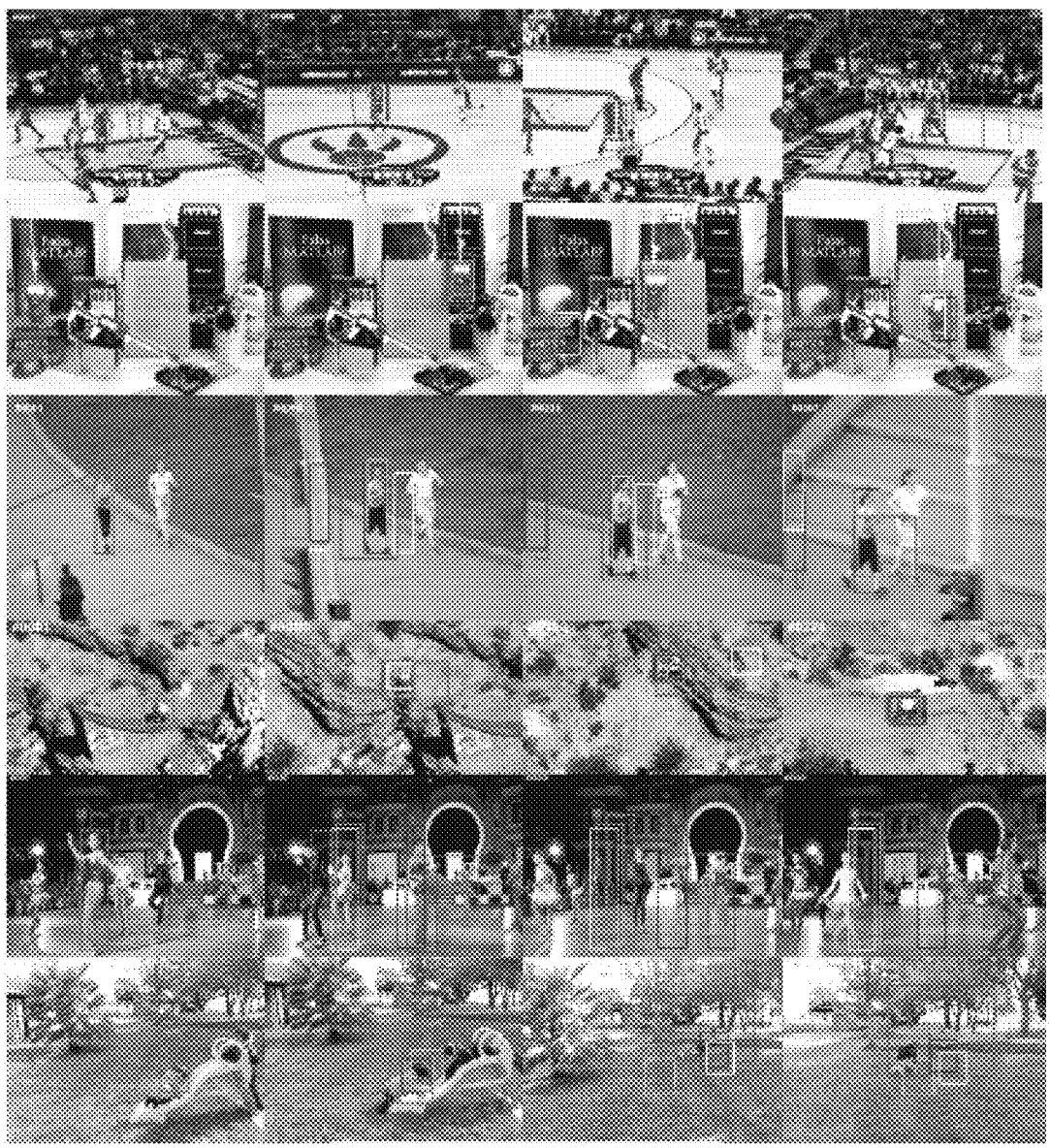
FIG. 7 shows tracking results for the present approach versus other methods.

Some tracking results are given in FIG. 7, as a first visual assessment of the behavior of the algorithm. The first and last image of the sequence are shown and some intermediate frames. FIG. 7 shows a comparison with different state-of-the-art methods some of which are top performing in previous benchmarks.

A dataset consisting of 38 sequences has been constructed from various references: 27 from a first reference; 4 from a second reference; and 7 original sequences, two of which are shown at the end of FIG. 7. Only color sequences have been selected. The sequences were furthermore tagged as depicting different situations, notably occlusion, out-of-view, fast motion, motion blur, scale variation, illumination variation, background clutter and low-resolution.

Visual inspection of the results using the whole dataset showed a consistent behavior of the method. In line with the modeling assumptions, the tracker is able to estimate a window that includes a large portion of the object, even along complex situations such as partial or total occlusions, deformation and rapid motions. As can be observed in the examples, robustness is increased, perhaps at the cost of high precision.

As previously mentioned, performance figures often used in the literature do not pay attention to the asymmetric problem of estimating a containing window of the object and instead attempt to minimize position error or maximizing area intersection between the tracker results and the ground-truth. The current approach is designed to maximize the related measure of object area recall (OAR), defined here as the number of pixels in the intersection between the tracker result and the ground truth object window with respect to the total pixels in the latter. In other words, it is a measure of how much of the object is effectively inside the estimated window. A successful tracking for a given frame is therefore defined to be whether the OAR is above a threshold. Thus, for each sequence the average number of correctly tracked frames is computed and the value of the threshold is varied as well in order to generate a curve or success plots as a function of the threshold, as in the example of FIG. 8.

Figure 8:
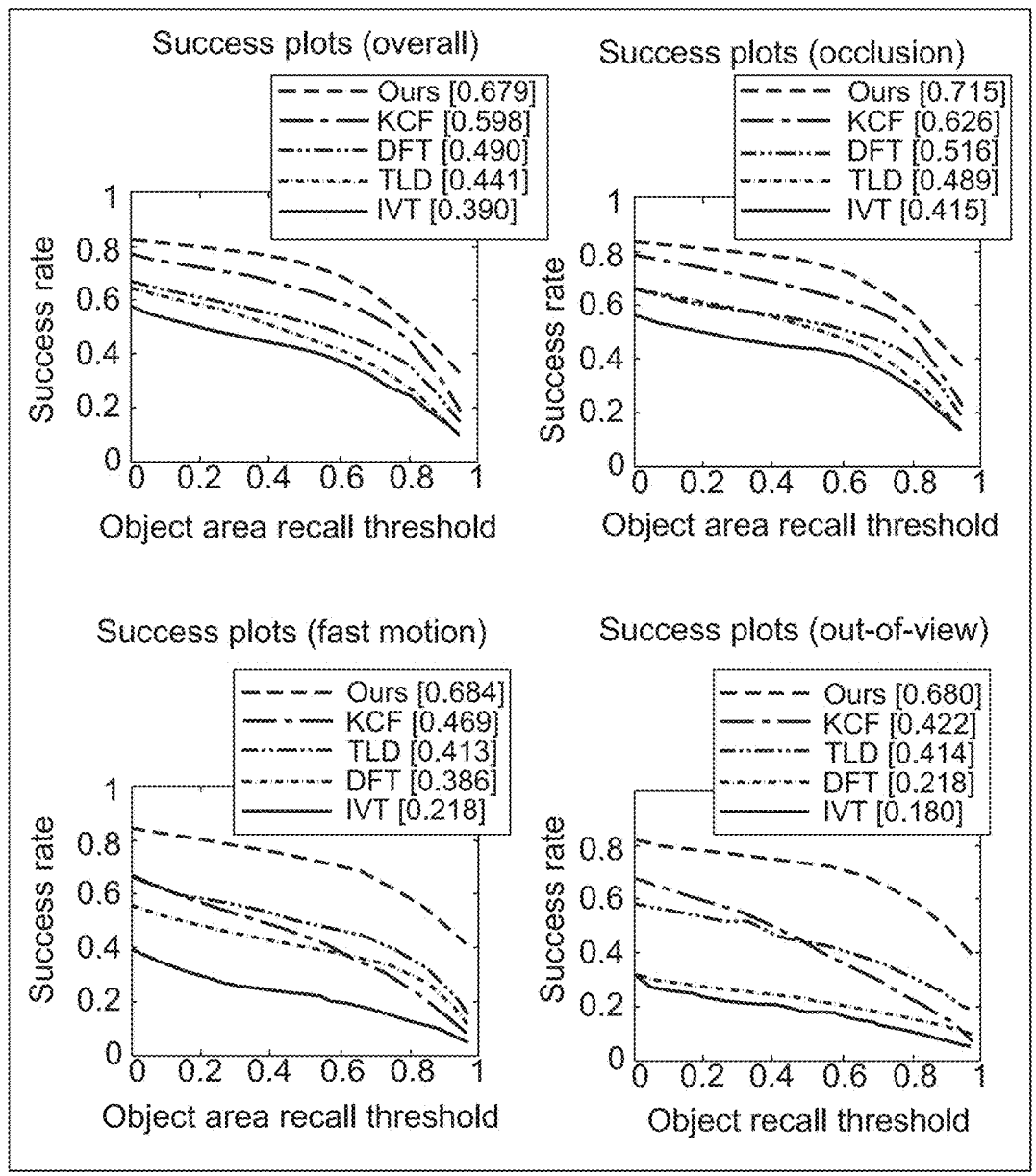
FIG. 8 shows tracking success plot curves.

This approach of using histogram hemimetrics results in superior performance relative to all of the reference methods among all the dataset and all the different types of sequence tags. A part of them is shown in FIG. 8. Next to each method name in the figure, the indicated value is the area-under-curve (AUC) used here as a global performance measure. Specially note the case of sequences labeled as out-of-view which shows the improvement of the current approach on keeping the object on track even after it disappears and re-enters the scene.

Figure 9:
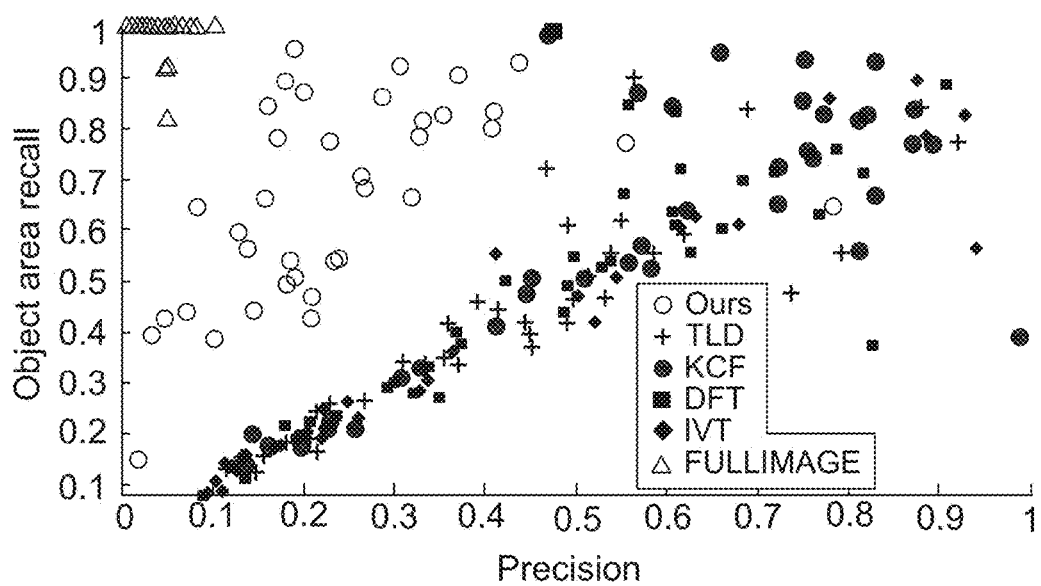
FIG. 9 shows precision recall dispersion.

One of skill in the art can point out that object area recall can be maximized by simply taking the window that coincides with the full image, for every frame. Effectively this gives 100% recall. However, precision, that is, the ratio between the object true area and the estimated window area, is very poor in that case, Though the present method is designed for recall, a high precision is of course always desired and necessary for the tracker to be useful. In FIG. 9, the dispersion of precision-recall for each sequence and each tracker is plotted. Also included is the full-image tracker. While the latter shows a value of recall that is nearly always equal to 100%, precision is never greater than 10%. On the contrary, previous tracking methods, such as TLD, KCF, DFT, IVT for example, essentially designed for maximizing both precision and recall show a linear-shaped dispersion, where in general, they obtain either both high precision recall values or both poor values. The present method behaves differently. It shows a significantly higher recall for almost every sequence together with precision values that rise up to 60%. Note that one can expect that for a given required precision value, the recall of the algorithm will be higher.

Many applications such as automatic zoom, video reframing or video cropping at large [22, 23, 24] require estimating a window that contains an interest object and adapting it to object support and deformations. The present method is designed for this use. The base approach taken here does not include any temporal filtering process to the estimated window, which renders a jittery result that can be annoying for visualization for the mentioned applications.

A simple window filtering method is hereby proposed to obtain a stable visualization window from the tracker result which, however, does not influence the latter. While tracking at frame $I_k$, take the last n (e.g. n=10) estimates of the window and take the biggest window $\mathcal{B}_k^{max}$ enclosing each window of this list, that is, take the minimum of $x_{left}, y_{top}$ and the maximum of $x_{right}, y_{bottom}$. Then, this value is temporally averaged with the previous estimation of the window $\mathcal{B}_k^{vis} = \gamma \cdot \mathcal{B}_k^{max} + (1-\gamma) \mathcal{B}_{k-1}^{vis}$, using a coefficient $\gamma=0.2$.

Figure 10:
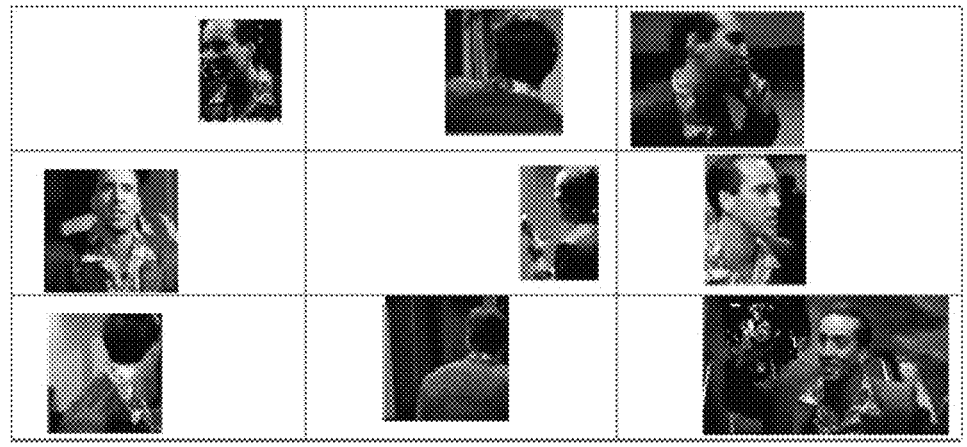
FIG. 10 shows results of object cropping for a first sequence.
Figure 11:
FIG. 11 shows results of object cropping for a second sequence.
Figure 12:
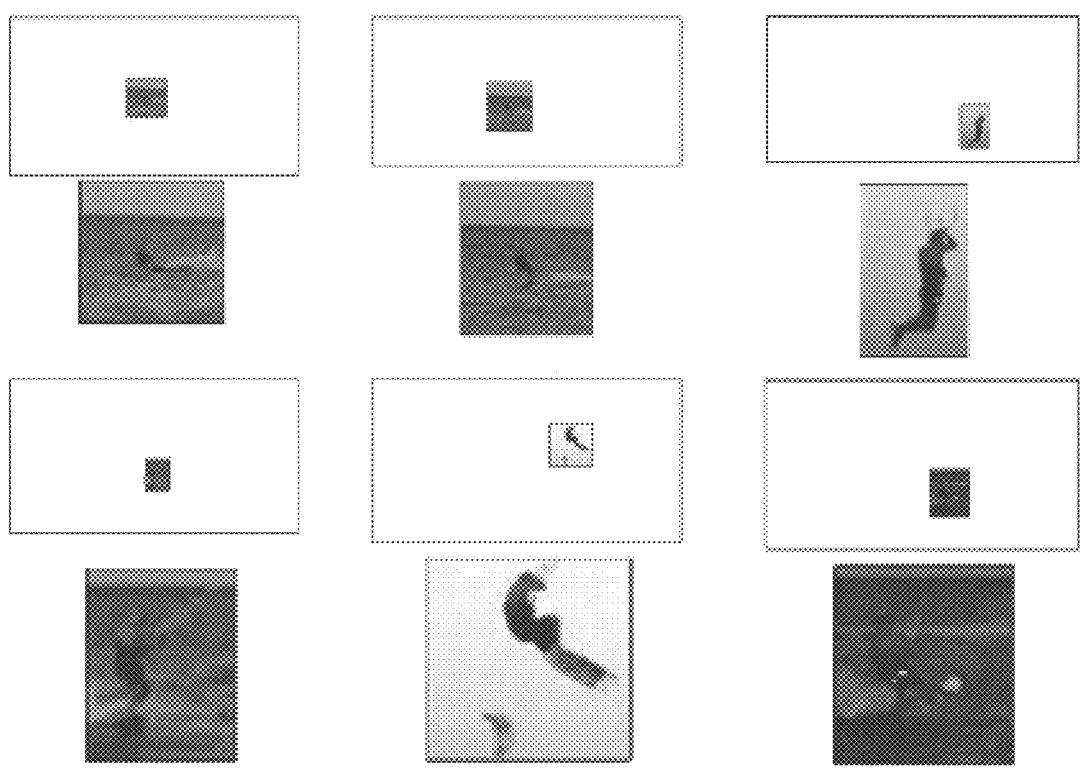
FIG. 12 shows results of object cropping for a third sequence.

In FIGS. 10, 11 and 12 the object of interest is cropped from the image as shown. Different aspects of the method are to be noted here, such as the window shape adaptation to the object support. This occurs when the object changes its shape and size but also, as seen in FIG. 11, when an occlusion occurs. In the latter case, the method augments the window as it cannot find the object and then it readjusts it when the target is again visible. Next, note the robustness of the cropping method to large deformations of the object as seen particularly in FIG. 10. Finally, even for small and rapidly moving objects as shown in FIG. 12, the tracker works correctly and permits zooming into details.

Figure 13:
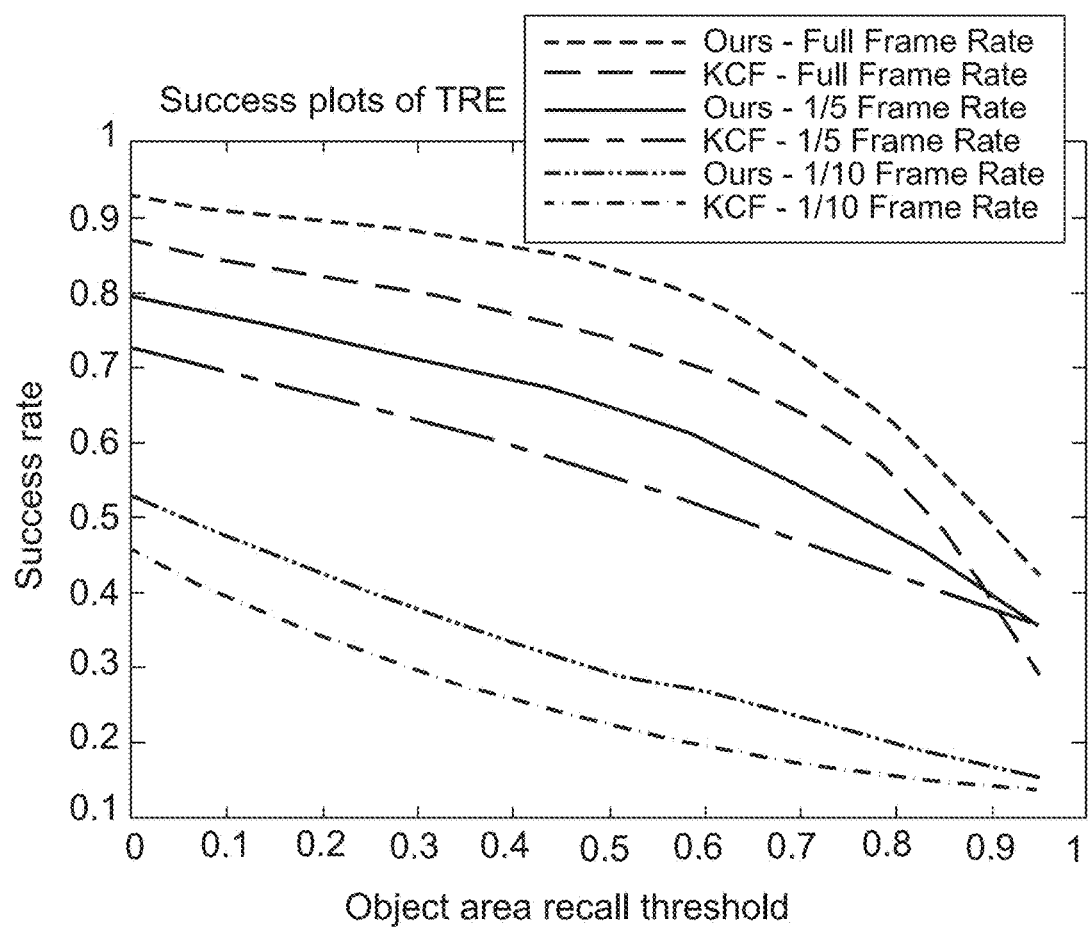
FIG. 13 shows success plot curves for different frame rates.

The proposed method has appealing behaviors that are worth pointing out. The global modeling of the object together with a motion agnostic estimation and the ability to largely adapt the window shape and size, make the method particularly robust to low video frame rates. This has two consequences. First, low frame rates normally imply large displacements and deformations that are difficult to deal with, especially for model based approaches. Second, a sustained performance at low frame rates also translates into a better adaptation to real time processing and frame dropping. Essentially, the tracker can be fed with a slower frame rate, in order to guarantee the online estimation. The present method can be analyzed at different frame-rates. In FIG. 13, the success plots are given for the original sequences and time-sub-sampled versions of these sequences, using a frame rate reduction of 1/10 and 1/5. The degradation for the reference method KCF is significantly higher than using the present method, which still shows a better figure even at 1/10 frame-rate compared to KCF at 1/5 frame-rate.

A further revealing experiment consisted of a live real-time tracking with a webcam. An 8-minute sequence of a face with a variety of interesting complications showed the ability of the tracker to support and recover from situations such as total and partial occlusions; background clutter; out-of-view and viewpoint changes. Both the estimated tracking window and the filtered visualization window are shown in FIGS. 14 a-e, as explained earlier. In Figs. a) and b) note how total occlusions lead the window estimation to occupy the whole image as the object is absent, while partial occlusions do not perturb the current method. In c), even other faces with similar colors do not "steal" the tracker from the target object. In d) an out-of-view object behaves as a total occlusion. Finally in e), the robustness of the method to viewpoint and pose variations is shown.

This approach to the problem of object tracking addresses how to determine an image window that contains the object at each time instant. The use of these novel criteria for locating the target together with a well-adapted hemimetric has shown a better performance in terms of object area recall compared to top performing trackers. The method is conceptually attractive and due to its simplicity it is prone to be extended to more sophisticated feature spaces and estimation strategies.

One embodiment of the present principles can be described as follows. The template learning stage can be carried out with the following steps. The color image is quantified to C color values (C=256, 128, etc) represented by a color index map. Each pixel of the image is then assigned an index.

The system computes a histogram of C bins of the indexes of the $P$ pixels belonging to the object according to the initial window (FIG. 2. In red). The histogram is not normalized, but one can keep the bin count for each bin. This histogram is called htemplate=[b0, b1, b2, ... bC−1], where bi is the bin count for bin i and such that $\Sigma biC-1i=0=P$.

An external window bigger (normally 50% bigger, but customizable) than the original bounding box (FIG. 2. in yellow) is considered and a histogram of C bins is computed on the external ring, and considered as a background histogram hbackground.

Then compute the difference g=htemplate−hbackground and the final template histogram is set to bi=gi if gi>0 and bi=0 otherwise. In this way only the part of the histogram that cannot be compensated by the close background is kept, which avoids modeling non-discriminative colors. The object template, htemplate, is stored.

One embodiment of the tracking stage can be implemented as follows. Suppose the position and shape of the bounding box for a given frame t of the sequence is known. Its coordinates are described by the quadruplet Wt=[xleft, ytop,xright,ybottom].

For the next frame start by computing an integral histogram Ht+1 [5] of the image, previously quantified according to the color index map. Ht+1 is a width×height×C array of bin counts and allows a posterior very efficient computation of histograms for several windows on the image, An initial bounding box is determined by taking the previous bounding box and enlarging its size by some proportion or number of pixels in each coordinate, i.e. Wt+10=[xleft−Δx,ytop−Δy,xright+Δx,ybottom+Δy]. From the integral histogram Ht+1 the histogram of indexes for Wt+10 is rapidly obtained, that is, h(Wt+10)=[d0, d1, d2 . . . dC−1].

Compute the following distance between htemplate and h(Wt+10) as ρ(htemplate,h(Wt+10))=Σδbi>di(bi−di)C−1i=0ΣbiC−1i=0

Note that ρ is a hemi-distance as it is not symmetric and only fulfills the axiom of triangular inequality. This value can be interpreted as the proportion of pixels in the template that find no pixel in the current window with the same color index, assuming a 1-to-1 mapping between pixels of the two histograms. FIG. 3a illustrates the histogram distance computation.

An initial adjustment of the window is made as follows. If ρ(htemplate,h(Wt+10))<α the object can be assumed to be effectively inside the window Wt+10. α takes a (customizable) value of 0.5. The window is reduced in the next iteration in one or more pixels per coordinate at the same time to obtain Wt+11 or, in general, Wt+1 i for the i-th iteration. This step is repeated while ρ(htemplate,h(Wt+1i))<α.

A second adjustment of the window is made as follows. For a fixed coordinate among the four, the window is enlarged in one or more pixels while ρ(htemplate,h(Wt+1i))<ρ(htemplate,h(Wt+1i−1)), i.e. as long as the new window is strictly better in terms of assuring that the object is inside. (Here note that if Wt+1i ⊂ Wt+1j then ρ(htemplate, h(Wt+1j))≤ρ(htemplate,h(Wt+1i))) This step is repeated for each of the four coordinates [xleft,ytop,xright,ybottom]. The value of Wt+1i that exits these last two iterations is then taken as Wt+1.

The template update process can be implemented as follows. The biggest bin of the template htemplate is extracted. Suppose its bin index is k, then take bk and the proportion β=bkΣbiC−1i=0 is computed. The template is updated only at such bin by bknew=(1−β)bk+βdk, where dk was defined as the k-th bin of h(Wt+1). In this way the dominant color is considered to correspond to the object and this avoids updating a color that belongs to the background.

Figure 15:
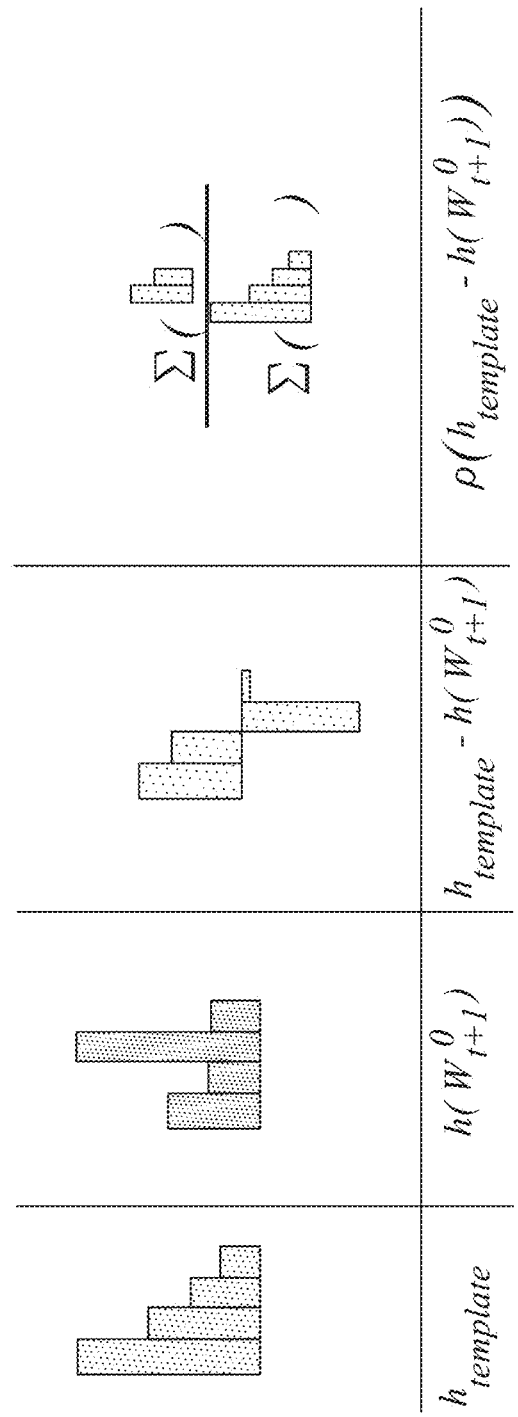
FIG. 15 shows distance computation between template and other tested window histograms.

FIG. 15 shows a distance computation between template and tested window histograms.

The output of the tracking process is a bounding box for each frame that contains the object. This being robust according to the criteria of the present method, it can be noisy as there is no precise localization of the object center. Consequently, a posterior temporal filtering of the bounding box can be applied, independent of the tracking process, depending on the application. Among different options are averaging the last K windows, taking the median of the last K windows, and implementing more complex filtering techniques, for example, a Kalman filter.

Figure 16:
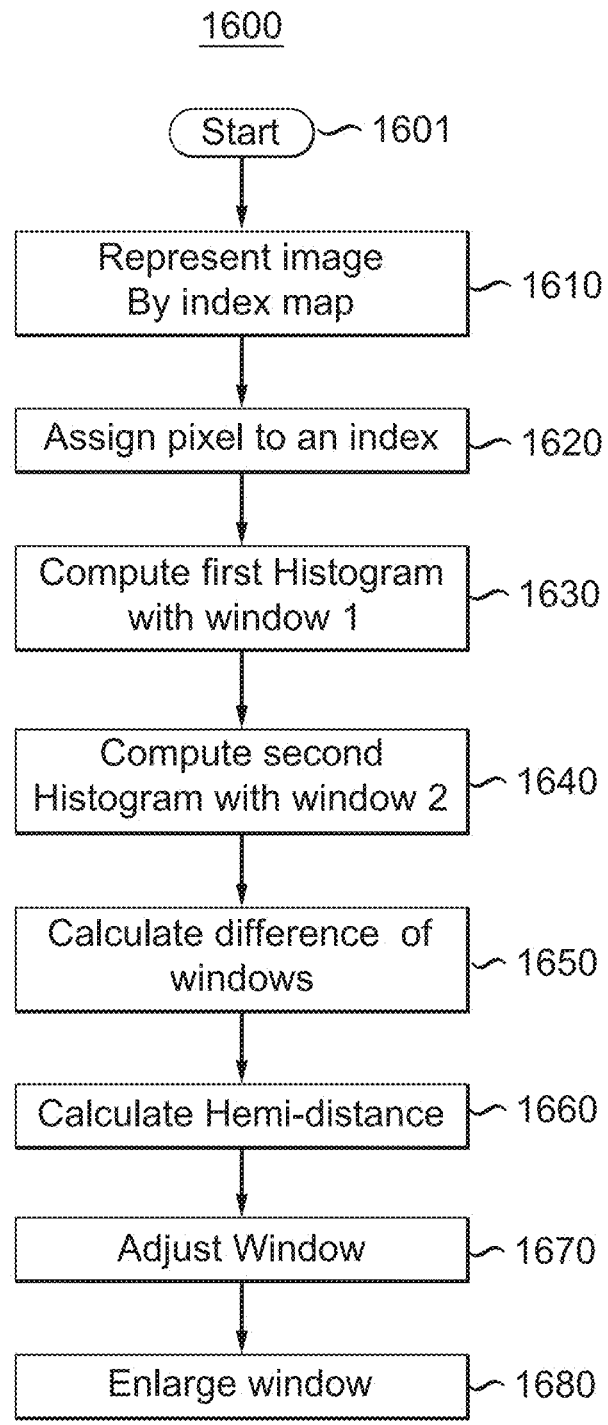
FIG. 16 shows one embodiment of a method under the present principles.

One embodiment of a method 1600 under the present principles is shown in FIG. 16. The method commences at Start block 1601 and proceeds to block 1610 for representing an image by a color index map wherein each color index corresponds to a color. To that end control proceeds to block 1620 for assigning color index to each pixels of the first image. Control proceeds to block 1630 for computing a first histogram using a first window. Control proceeds to block 1640 for computing a second histogram using a second window, and then to block 1650 for calculating a difference between the two histograms. Control then proceeds from block 1650 to block 1660 for calculating a hemi-distance. Advantageously, the hemi-metric distance is representative of a proportion of pixels in the tracked object having no pixel in a current window of the second image with an equal color index. Control then proceeds from block 1660 to block 1670 for adjusting by reducing the current window be smaller until an object to be tracked cannot fit into the window any longer. Control then proceeds from block 1670 to block 1680 for enlarging the window so that the object just fits into the current window. The calculating of the a hemi-distance is repeated while adjusting the current window.

Figure 17:
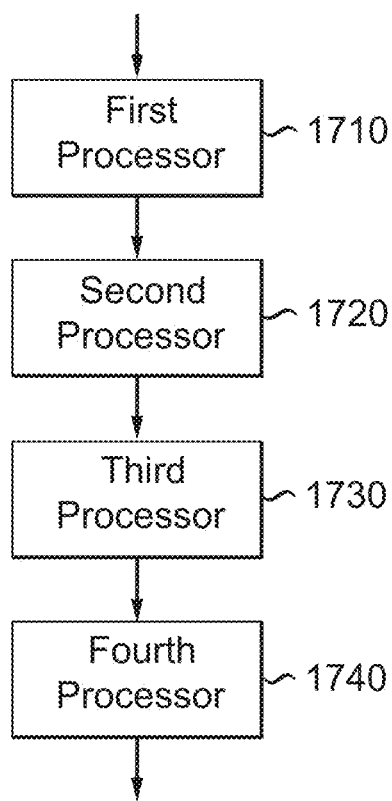
FIG. 17 shows one embodiment of an apparatus under the present principles.

One embodiment of an apparatus 1700 under the present principles is shown in FIG. 17. The apparatus is comprised of a first processor 1710 for representing a first image by a color index map wherein each pixel of the first image is assigned a color index. The output of first processor 1710 is in signal connectivity with the input of a second processor 1720 for computing a first histogram of bins based on the indices of the pixels belonging to a first window in the first image containing the object to track and computing a second histogram of bins based on the indices of the pixels belonging to a second window which is larger than the first window and surrounds the first window. The apparatus further comprises a third processor 1730 whose input is in signal connectivity with the output of second processor 1720 and that calculates a difference between the first histogram and the second histogram as an object template and calculates a hemi-distance between the object template and histogram based on color indices of pixels belonging to a current window of the second image. Advantageously, the third processor also keeps the values of the object template that are positive and sets negative values of the object template to zero. Advantageously, the hemi-distance is representative of a proportion of pixels in the object to track having no pixel in a current window with an equal color index. The output of third processor 1730 is in signal connectivity with the input of fourth processor 1740 which adjusts the current window until the hemi-distance is no longer less than a threshold and enlarges the current window using each corner coordinate of the window until the object is contained within the window to produce a bounding box containing the object. Therefore the window is adjusted according to the value of the hemi-distance.

The processors in any of the described embodiments can be implemented using distinct processors, integrated processors, or some combination of integrated and distinct processors. One or all of the processors can be implemented as part of other circuitry as well.

The present description illustrates the present principles. It will thus be appreciated that those skilled in the art will be able to devise various arrangements that, although not explicitly described or shown herein, embody the present principles and are thereby included within the present principles.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which can be substantially represented in computer readable media and so executed by a computer or processor, whether or not such computer or processor is explicitly shown.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage.

Other hardware, conventional and/or custom, can also be included. Similarly, any switches shown in the figures are conceptual only. Their function can be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

These and other features and advantages of the present principles can be readily ascertained by one of ordinary skill in the pertinent art based on the teachings herein. It is to be understood that the teachings of the present principles can be implemented in various forms of hardware, software, firmware, special purpose processors, or combinations thereof.

Most preferably, the teachings of the present principles are implemented as a combination of hardware and software. Moreover, the software can be implemented as an application program tangibly embodied on a program storage unit. The application program can be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform can also include an operating system and microinstruction code. The various processes and functions described herein can be either part of the microinstruction code or part of the application program, or any combination thereof, which can be executed by a CPU. In addition, various other peripheral units can be connected to the computer platform such as an additional data storage unit and a printing unit.

It is to be further understood that, because some of the constituent system components and methods depicted in the accompanying drawings are preferably implemented in software, the actual connections between the system components or the process function blocks can differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles are not limited to those precise embodiments, and that various changes and modifications can be effected therein by one of ordinary skill in the pertinent art without departing from the scope of the present principles. All such changes and modifications are intended to be included within the scope of the present principles as set forth in the appended claims.

What is claimed, is:

1. A method for obtaining a bounding box into a second image containing an object of a first image, comprising:
  representing said first image by a color index map wherein a color index corresponds to a color and a color index is assigned to each pixel of said first image;
  computing a first histogram based on said color indices of the pixels belonging to a first window in the first image containing said object;
  computing a second histogram based on said color indices of the pixels belonging to a second window in the first image surrounding the first window;
  obtaining an object template by calculating a difference between the first histogram and the second histogram;
  calculating a hemimetric distance between the object template and a histogram based on color indices of pixels belonging to a current window of the second image;
  reducing said current window until said hemimetric distance is no longer less than a threshold;
  enlarging said current window using each corner coordinate of said current window until the object is contained within said current window to produce a bounding box in said second image containing said object.

2. The method of claim 1, wherein the histogram based on color indices of pixels belonging to a current window of the second image is obtained from an integral histogram of the second image.

3. The method of claim 1, further comprising keeping the values of the object template that are positive and setting negative values of the object template to zero.

4. The method of claim 1, further comprising obtaining said bounding box for a plurality of second images of a video sequence and temporally filtering said bounding box.

5. An apparatus for obtaining a bounding box into a second image containing an object of a first image, comprising a processor configured to:
  represent said first image by a color index map wherein a color index corresponds to a color and a color index is assigned to each pixel of said first image;
  compute a first histogram based on said color indices of the pixels belonging to a first window in the first image containing said object; and to compute a second histogram based on said color indices of the pixels belonging to a second window in the first image surrounding the first window;
  obtain an object template by calculating a difference between the first histogram and the second histogram; and to calculate a hemi-metric distance between the object template and a histogram based on color indices of pixels belonging to a current window of the second image;
  to reduce said current window until said hemimetric distance is no longer less than a threshold; and to enlarge said current window using each corner coordinate of said current window until the object is contained within said current window to produce a bounding box in said second image containing said object.

6. The apparatus of claim 5, wherein said processor is further configured to calculate said histogram based on color indices of pixels belonging to a current window of the second image from an integral histogram of the second image.

7. The apparatus of claim 5, further configured to obtain said bounding box for a plurality of second images of a video sequence and a filter to temporally filter said bounding box.

8. A non-transitory program storage device, readable by a computer, tangibly embodying a program of instructions executable by the computer to perform a method for obtaining a bounding box into a second image containing an object of a first image comprising:
  representing said first image by a color index map wherein a color index corresponds to a color and a color index is assigned to each pixel of said first image;
  computing a first histogram based on said color indices of the pixels belonging to a first window in the first image containing said object;
  computing a second histogram based on said color indices of the pixels belonging to a second window in the first image surrounding the first window;
  obtaining an object template by calculating a difference between the first histogram and the second histogram;
  calculating a hemimetric distance between the object template and a histogram based on color indices of pixels belonging to a current window of the second image;
  reducing said current window until said hemimetric distance is no longer less than a threshold;
  enlarging said current window using each corner coordinate of said current window until the object is contained within said current window to produce a bounding box in said second image containing said object.

9. The non-transitory program storage device of claim 8, wherein said histogram based on color indices of pixels belonging to a current window of the second image is obtained from an integral histogram of the second image.

10. The non-transitory program storage device of claim 8, further comprising obtaining said bounding box for a plurality of second images of a video sequence and a filter to temporally filter said bounding box.

* * * * *